July 14, 1925.
1,546,196
I. BROBERG
MEANS FOR SHIFTING THE LOAD FROM ONE CARRIAGE
TO ANOTHER COUPLED TO THE SAME
Filed Aug. 29, 1922
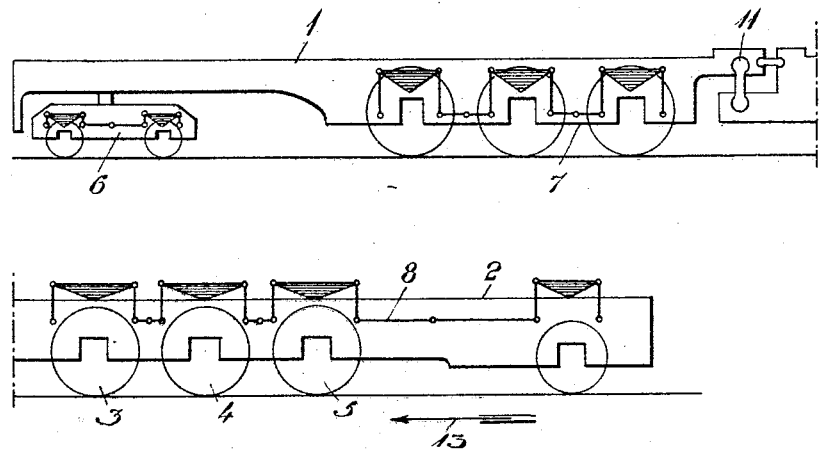
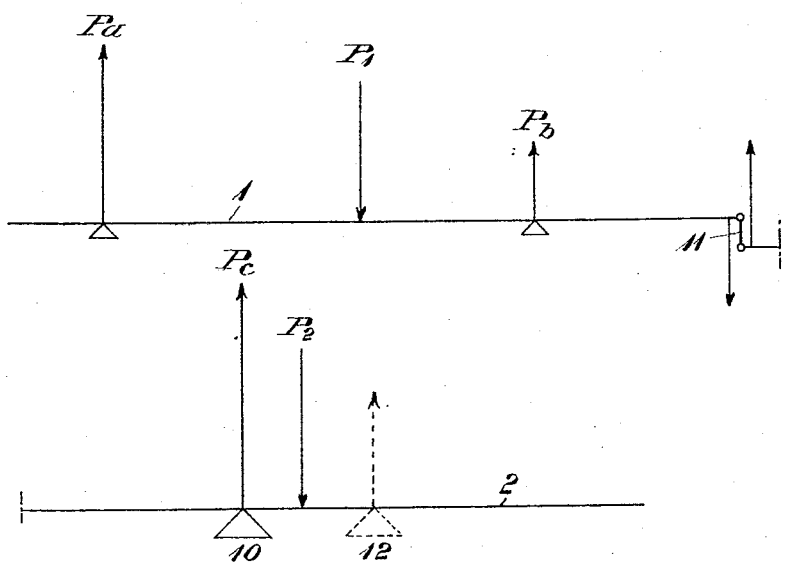

Patented July 14, 1925.

1,546,196

UNITED STATES PATENT OFFICE.

ISIDOR BROBERG, OF SKARSATRA, SWEDEN, ASSIGNOR TO AKTIEBOLAGET LJUNG-STRÖMS ANGTURBIN, OF STOCKHOLM, SWEDEN, A CORPORATION.

MEANS FOR SHIFTING THE LOAD FROM ONE CARRIAGE TO ANOTHER COUPLED TO THE SAME.

Application filed August 29, 1922. Serial No. 585,024.

*To all whom it may concern:*

Be it known that I, ISIDOR BROBERG, engineer, a subject of the King of Sweden, residing at Tallhyddan, Skarsatra, Lidingon, Sweden, have invented certain new and useful Improvement in Means for Shifting the Load from One Carriage to Another Coupled to the Same, of which the following is a specification.

In two carriages coupled to each other means have previously been proposed for supporting the carriages by their frameworks and for coupling the carriages so as to obtain the desired wheel pressures. The object of these means have only been to displace the pressure within each carriage for instance from fore pairs to rear pairs of wheels but not to increase or decrease the wheel pressures on all the wheel shafts of a carriage.

Such means are however necessary especially in case of two carriages, which are to be coupled to each other, appertaining to the same locomotive aggregate, since in such case it proves frequently difficult to locate the different aggregates on the carriages in such manner that the desired wheel pressure is obtained, that is to say, that the wheel pressures on the driving wheels become as large as possible or as is permitted in each separate case. In locomotives consisting of two carriages it is frequently necessary to locate several aggregates on the one carriage, although said aggregates in view of the load ought to have been located on the other carriage. In this case it is necessary that the load can be shifted from the one carriage to the other.

This invention relates to means for shifting the load from one carriage to another coupled to the other in order to adjust the wheel pressures of the carriages and consists in that the one carriage is supported with stable equilibrium when resting exclusively on its supporting framework and the other carriage with unstable equilibrium when resting exclusively on its supporting framework, the carriages being coupled by means of a coupling by the aid of which the one carriage supports in part the other one.

An embodiment of the invention is illustrated diagrammatically in the accompanying drawing, in which:—

Fig. 1 shows a locomotive consisting of two carriages coupled to each other and constructed according to the invention. Fig. 2 is a diagram displaying the forces actuating the carriages and the wheels.

Referring to the drawing, 1 designates the framework supporting the steam boiler of the locomotive, the frame-work 2 supporting a condenser appertaining to the locomotive, and the driving machinery of the latter. 3, 4 and 5 designate the driving wheels of the rear carriage. The normal direction of runinng of the locomotive is indicated by the arrow 13.

The frame-work 1 is supported by the driving wheels by means of two spring systems 6 and 7, this carriage thus being supported with stable equilibrium, whereas the carriage 2 supported only by means of a single spring system 8 is supported with unstable equilibrium. This will appear from Fig. 2, the arrows $P_1$, $P_a$ and $P_b$ indicating the forces arising on the carriage 1. $P_1$ indicates the weight of the carriage and $P_a$ and $P_b$ the counter-pressures effected by the yielding support. The carriage 2 is supported by its frame-work in such manner that the weight of the carriage operates according to the arrow $P_2$, the point of support caused by the spring system 8 being situated for instance at 10, the pressure caused by the frame-work being indicated by the arrow $P_c$. This will be possible in case the carriages according to the invention are coupled by means of a vertical joint 11 taking up the moment caused by the force $P_2$ on account of the position of the point of support 10. In case the point of support 10 be positioned between the force $P_2$ representing the weight of the carriage and the joint 11, the pressure at 10 and at the same time all the wheel pressures will increase, whereas if the point of support be located at the other side of the center of gravity, for instance at 12, the pressure at this point as well as the wheel pressures will decrease, the carriage 2 then by the aid of the joint 11 being supported in part by the other carriage.

Consequently according to the invention the wheel pressures of the carriage supported with unstable equilibrium may be increased by the carriage being resiliently supported at a point between the center of gravity and the place where this carriage is coupled to the other carriage, whereas the wheel pressures may be decreased by the resilient point of support being located at the other side of the center of gravity.

Obviously several embodiments of the invention may be conceived without deviating from the scope of the invention.

What I claim as new and desire to secure by Letters Patent of the United States is:—

1. The combination with a carriage, of another carriage coupled to same, each carriage containing at least two pairs of wheels between which the perpendicular through the centre of gravity of the carriage passes, the one carriage being so supported as to be in stable equilibrium, when resting exclusively on its supporting framework, whereas the other carriage is so supported as to be in unstable equilibrium, when resting exclusively on its supporting framework, and a coupling between the carriages by the aid of which the one carriage supports in part the other.

2. The combination with a carriage, of another carriage coupled to same, each carriage containing at least two pairs of wheels between which the perpendicular through the centre of gravity of the carriage passes, the one carriage being so supported as to be in stable equilibrium, when resting exclusively on its supporting framework, whereas the other carriage is so supported as to be in unstable equilibrium, when resting exclusively on its supporting framework, the carriage supported with stable equilibrium running in front of the carriage supported with unstable equilibrium counted in the normal direction of running, and a coupling between the carriages by the aid of which the one carriage supports in part the other.

3. The combination with a carriage of another carriage coupled to same, each carriage containing at least two pairs of wheels between which the perpendicular through the centre of gravity of said carriage passes, the one carriage being so supported at two points by two spring systems, as to be in stable equilibrium, when resting exclusively on its spring system, whereas the other carriage is so supported at only a point by one spring system only located at the side of the centre of gravity of said carriage, as to be in unstable equilibrium, when resting exclusively on its spring system, and a coupling between the carriages by the aid of which the one carriage supports in part the other.

4. The combination with a carriage, of another carriage coupled to same, each carriage containing at least two pairs of wheels between which the perpendicular through the centre of gravity of the carriage passes, the one carriage being so supported as to be in stable equilibrium, when resting exclusively on its supporting framework, whereas the other carriage is so supported as to be in unstable equilibrium, when resting exclusively on its supporting framework, the carriage supported with unstable equilibrium containing driving wheels, and a coupling between the carriages by the aid of which said carriage is supported in part by the other.

In testimony whereof I affix my signature in presence of two witnesses.

ISIDOR BROBERG.

Witnesses:
  S. SWENSON,
  IVER FALK.